(12) United States Patent
Krasnov et al.

(10) Patent No.: US 10,207,951 B2
(45) Date of Patent: *Feb. 19, 2019

(54) WINDOW WITH UV-TREATED LOW-E COATING AND METHOD OF MAKING SAME

(71) Applicant: Guardian Glass, LLC, Auburn Hills, MI (US)

(72) Inventors: Alexey Krasnov, Canton, MI (US); Muhammad Imran, Hamilton, NJ (US); Willem Den Boer, Brighton, MI (US); Kevin O'Connor, LaSalle (CA)

(73) Assignee: Guardian Glass, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,926

(22) Filed: Feb. 27, 2018

(65) Prior Publication Data

US 2018/0186692 A1 Jul. 5, 2018

Related U.S. Application Data

(63) Continuation of application No. 13/484,894, filed on May 31, 2012, now Pat. No. 9,919,959.

(51) Int. Cl.
*C03C 17/36* (2006.01)

(52) U.S. Cl.
CPC ............ *C03C 17/36* (2013.01); *C03C 17/366* (2013.01); *C03C 17/3644* (2013.01); *C03C 2217/74* (2013.01); *C03C 2218/32* (2013.01)

(58) Field of Classification Search
CPC .................................................. C03C 17/36

(Continued)

(56) References Cited

U.S. PATENT DOCUMENTS 4,664,769 A 5/1987 Cuomo et al.
5,156,894 A 10/1992 Hood et al.
(Continued)

FOREIGN PATENT DOCUMENTS

EA 200870318 2/2009
JP 2003-012345 1/2003
(Continued)

OTHER PUBLICATIONS

U.S. Appl. No. 13/484,894, filed May 31, 2012; Krasnov et al.
(Continued)

*Primary Examiner* — Jason McCormack
(74) *Attorney, Agent, or Firm* — Nixon & Vanderhye P.C.

(57) ABSTRACT

Certain embodiments of this invention relates to a coated article including a low-emissivity (low-E) coating supported by a substrate (e.g., glass substrate) for use in a window, where the low-E coating is exposed to ultraviolet (UV) radiation in order to improve the coating's and thus the coated article's electrical, optical and/or thermal blocking properties. The low-E coating includes at least one infrared (IR) reflecting layer of or including silver which is located on and directly contacting a contact/seed layer of or including metal oxide such as zinc oxide and/or zinc stannate. Exposing the low-E coating to UV radiation, e.g., emitted from a UV lamp(s) and/or UV laser(s), allows for selective heating of the contact/seed layer which in turn transfers the heat energy to the adjacent IR reflecting layer. This heating of the silver inclusive layer improves the silver layer's electrical, optical and/or thermal blocking properties. The UV treated coated article, with its improved properties, may be used in the context of monolithic or insulating glass (IG) window units.

23 Claims, 2 Drawing Sheets

(58) Field of Classification Search
USPC .......................................... 250/492.1, 492.2
See application file for complete search history.

(56) References Cited

U.S. PATENT DOCUMENTS

| | | | |
|---|---|---|---|
| 5,306,547 | A | 4/1994 | Hood et al. |
| 5,308,662 | A | 5/1994 | Woodard et al. |
| 5,506,037 | A * | 4/1996 | Termath ............ B32B 17/10174 |
| | | | 359/360 |
| 5,514,476 | A | 5/1996 | Hartig et al. |
| 5,557,462 | A | 9/1996 | Hartig et al. |
| 5,784,853 | A | 7/1998 | Hood et al. |
| 5,800,933 | A | 9/1998 | Hartig et al. |
| 6,014,872 | A | 1/2000 | Hartig et al. |
| 6,632,491 | B1 | 10/2003 | Thomsen et al. |
| 8,101,278 | B2 | 1/2012 | Laird |
| 8,114,488 | B2 | 2/2012 | Alvarez |
| 8,124,237 | B2 | 2/2012 | Nunez-Regueiro et al. |
| 8,142,622 | B2 | 3/2012 | Ferreira et al. |
| 8,173,263 | B2 | 5/2012 | Lingle et al. |
| 8,221,833 | B2 | 7/2012 | Veerasamy et al. |
| 9,919,959 | B2 * | 3/2018 | Krasnov .................. C03C 17/36 |
| 2008/0008829 | A1 | 1/2008 | Blacker et al. |
| 2008/0264558 | A1 | 10/2008 | Hayes et al. |
| 2009/0135319 | A1 * | 5/2009 | Veerasamy ........... G02F 1/1334 |
| | | | 349/16 |
| 2010/0071810 | A1 | 3/2010 | Nadaud et al. |
| 2010/0215903 | A1 | 8/2010 | Tonar et al. |
| 2010/0230543 | A1 | 9/2010 | Bruce et al. |
| 2010/0266801 | A1 | 10/2010 | Jahoda et al. |
| 2010/0295330 | A1 | 11/2010 | Ferreira et al. |
| 2011/0273085 | A1 | 11/2011 | Garbar et al. |
| 2011/0308693 | A1 | 12/2011 | Van Nutt et al. |
| 2012/0087005 | A1 | 4/2012 | Reymond et al. |
| 2012/0231228 | A1 | 9/2012 | Fujimori et al. |
| 2013/0122261 | A1 | 5/2013 | Barnes et al. |

FOREIGN PATENT DOCUMENTS

| | | |
|---|---|---|
| JP | 2012-037667 | 2/2012 |
| JP | 2014-531106 | 11/2014 |
| RU | 2 404 142 | 11/2010 |
| RU | 2 406 704 | 12/2010 |
| RU | 2 432 329 | 10/2011 |
| TW | 567343 | 12/2003 |
| WO | WO 2006/064059 | 6/2006 |
| WO | WO 2006/122900 | 11/2006 |
| WO | WO 2007/064450 | 6/2007 |
| WO | WO 2007/101964 | 9/2007 |
| WO | WO 2010/136788 | 12/2010 |
| WO | WO 2011/068111 | 6/2011 |
| WO | WO 2013/002983 | 1/2013 |

OTHER PUBLICATIONS

U.S. Appl. No. 13/484,844, filed May 31, 2012; Krasnov et al.
RU Office Action-Search Report dated May 25, 2017 for RU Application No. 2014153524.

* cited by examiner

WINDOW WITH UV-TREATED LOW-E COATING AND METHOD OF MAKING SAME

This application is a continuation of application Ser. No. 13/484,894 filed May 31, 2012, the entire disclosure of which is hereby incorporated herein by reference in this application in its entirety.

Certain embodiments of this invention relate to a coated article including a low-emissivity (low-E) coating for use in a window, where the low-E coating is intentionally exposed to intense ultraviolet (UV) radiation in order to improve the coating's and thus the coated article's electrical, optical and/or thermal blocking properties. The low-E coating includes at least one infrared (IR) reflecting layer comprising or consisting essentially of silver, where the silver inclusive layer is located on (e.g., grown on by sputtering) and directly contacting a contact/seed layer comprising or consisting essentially of a material such as zinc oxide and/or zinc stannate. The IR reflecting layer and contact/seed layer may be located between dielectric layers in the low-E coating. Exposing the low-E coating to UV radiation, e.g., emitted from a UV lamp(s) and/or UV laser(s), allows for selective heating of the contact/seed layer (e.g., of zinc oxide and/or zinc stannate) which in turn transfers the heat energy to the adjacent IR reflecting layer of or including silver. This heating of the silver inclusive layer improves the silver layer's electrical, optical and/or thermal blocking properties. For example, this heating of the silver based layer caused by exposing the low-E coating to the UV radiation increases the silver based layer's conductivity (lowers its resistance) which in turn increases its ability to block (e.g., reflect) undesirable IR radiation. As another example, this heating of the silver based layer caused by low-E coating's exposure to the UV radiation increases the visible transmission of the silver based layer thereby improving its optical properties. The UV treated coated article, with its improved electrical, thermal blocking, and/or optical properties, may be used in the context of monolithic or insulating glass (IG) window units such as architectural windows for office buildings and/or apartment buildings, windows for homes, windows for freezer doors, and/or vehicle windows.

BACKGROUND OF THE INVENTION

IG window units are known in the art. For example, see U.S. Pat. Nos. 6,632,491; 6,014,872; 5,800,933; 5,784,853; 5,557,462; 5,514,476; 5,308,662; 5,306,547; and 5,156,894, all of which are hereby incorporated herein by reference. An IG window unit typically includes at least first and second substrates spaced apart from one another by at least one spacer and/or seal. The gap or space between the spaced apart substrates may or may not be filled with a gas (e.g., argon) and/or evacuated to a pressure less than atmospheric pressure in different instances. Solar control coatings, such as low-E coatings, are sometimes used in connection with IG window units in order to block IR rays from reaching the interior of a building on which the IG window unit is located.

Sputter deposited thin film solar control (e.g., low-E) coatings on glass are known in the art. For example, see U.S. Pat. Nos. 8,173,263, 8,142,622, 8,124,237, 8,101,278, 8,017,243, 7,998,320, 7,964,284, 7,897,260, 7,879,448, 7,858,191, 7,267,879, 6,576,349, 7,217,461, 7,153,579, 5,800,933, 5,837,108, 5,557,462, 6,014,872, 5,514,476, 5,935,702, 4,965,121, 5,563,734, 6,030,671, 4,898,790, 5,902,505, 3,682,528, all of which are hereby incorporated herein by reference. Sputter deposition of low-E coatings at approximately room temperature, not using an intentionally heated substrate, is advantageous due to the lower cost of non-heated vacuum coaters, high deposition rate, energy saving during deposition, and lower maintenance.

A sputter-deposited low-E coating usually includes a number of layers, including a silver layer that is deposited directly on a contact/seed layer of a material such as zinc oxide or zinc stannate ($ZnSnO_x$). The silver has transmission in the visible range at appropriate thicknesses and reflection in the IR range of the spectrum. Deposition conditions of the contact/seed layer and layer(s) over the silver determine optical and electrical properties of the silver such as solar heat gain coefficient, emissivity, sheet resistance, and visible transmission. The quality of room temperature sputter-deposited thin silver layers is poor, and heat treatment is often requires to improve the optical and electrical properties of the silver to acceptable levels. Such heat treatment (HT) is typically done in a convection oven, e.g., performed in combination with glass tempering for temperable products. However, there are also non-temperable and non-tempered products which do not have the advantage of having had the silver subjected to the HT during the tempering process.

It would be desirable to be able to improve the quality of sputter-deposited silver layers, e.g., in the context of low-E coatings, without having to subject the coated article including the coating to a thermal tempering process. Attempts to improve the quality of the room temperature sputter-deposited silver in low-E coatings by IR irradiation have proven problematic because much of the IR radiation if exposed from the coating side of the glass gets reflected by the silver, or if exposed from the glass side of the coated article gets first absorbed by the glass before reaching the coating and can damage the glass substrate before the temperature elevates to levels sufficient for improving the silver quality. It has been found, in accordance with certain example embodiments of this invention, that UV exposure is highly advantageous with respect to improving the quality of sputter-deposited silver layer(s), e.g., in the context of low-E coatings. For example, the coated article (e.g., glass substrate with a low-e coating thereon) can be exposed from the coating side so that the UV is absorbed by part(s) of the coating without damaging the glass substrate, and much of the UV is able to pass through the silver layer(s) without being reflected before it can perform the desired heating by heating up other layer(s) which are capable of transferring heat to the silver in order to improve its optical and electrical and properties. Thus, in certain example embodiments of this invention, UV exposure of a low-E coating can be used to efficiently improve optical and/or electrical properties of silver based layer(s), and thus also improve such properties of the overall coating, such as one or more of solar heat gain coefficient, emissivity, sheet resistance, and visible transmission.

BRIEF SUMMARY OF EXAMPLE EMBODIMENTS OF THE INVENTION

Certain embodiments of this invention relates to a coated article including a low-emissivity (low-E) coating for use in a window, where the low-E coating is intentionally exposed to intense ultraviolet (UV) radiation in order to improve the coating's and thus the coated article's electrical, thermal blocking, and/or optical properties. The low-E coating may include at least one infrared (IR) reflecting layer comprising or consisting essentially of silver, where the silver inclusive layer is located on (e.g., grown on by sputtering) and directly contacting a contact/seed layer comprising or consisting essentially of a material such as zinc oxide and/or zinc stannate. The IR reflecting layer and contact/seed layer may be located between dielectrics in the low-E coating. Exposing the low-E coating to UV radiation, e.g., emitted from a UV lamp(s) and/or UV laser(s), allows for selective heating of the contact/seed layer(s) (e.g., of zinc oxide and/or zinc stannate) which in turn transfers the heat energy to the adjacent IR reflecting layer of or including silver. This heating of the silver inclusive layer, by way of the heat generated by the contact/seed layer's absorbing of the UV and resulting heat generation, improves the silver layer's electrical, optical and/or thermal blocking properties. For example, this heating of the silver based layer caused by exposing the low-E coating to the UV radiation increases the silver based layer's conductivity (lowers its resistance) which in turn increases its ability to block (e.g., reflect) undesirable IR radiation. As another example, this heating of the silver based layer caused by low-E coating's exposure to the UV radiation increases the visible transmission of the silver based layer thereby improving its optical properties. In certain example embodiments, the entire or substantially the entire coating (with respect to its area as viewed from above) is exposed to the UV radiation, so that the entire or substantially the entire silver based layer is improved with respect to electrical, optical and/or thermal blocking properties. The bandgap of the contact/seed layer(s) is such that the contact/seed layer(s) absorbs more UV radiation than any other layer in the coating in certain example embodiments, and thus is the main layer(s) that generates heat. Intense UV exposure causes the contact/seed layer and silver based layer to heat up in exposed areas. Heating of the contact/seed layer causes the adjacent silver layer to also heat up in the UV exposed areas thereby physically changing the silver layer in those areas so as to densify and cause the silver layer to become more conductive and more transparent to visible light in the exposed areas. The UV treatment may be performed after the entire low-E coating has been deposited on the substrate, and/or during or after the contact/seed layer and the silver inclusive layer have been deposited but before other overlying layers are deposited. The UV treated coated article, with its improved electrical, optical and/or thermal blocking properties, may be used in the context of monolithic or insulating glass (IG) window units such as architectural windows for office buildings and/or apartment buildings, windows for homes, windows for freezer doors, and/or vehicle windows.

In certain example embodiments, there is provided a method of making a coated article for use in a window, the method comprising: having a coated article including a substrate that supports a coating comprising at least one layer comprising silver located on a layer comprising metal oxide that can absorb ultraviolet (UV) radiation; directing UV radiation from at least one UV source toward the coating and exposing the coating to UV radiation in order to reduce a sheet resistance of the coating and/or increase visible transmission of the coating.

In certain example embodiments of this invention, there is provided a method of making a coated article for use in a window, the method comprising: having a coated article including a glass substrate that supports a coating (e.g., low-E coating) comprising at least one substantially metallic layer (e.g., Au or Ag based layer) located directly on and contacting a layer comprising metal oxide that has a bandgap of from 3.2 to 3.4 eV; directing UV radiation from at least one UV source toward the coating and exposing the coating to UV radiation in order to reduce a sheet resistance of the coating and increase visible transmission of the coating.

DETAILED DESCRIPTION OF EXAMPLE EMBODIMENTS OF THE INVENTION

Figure 1:
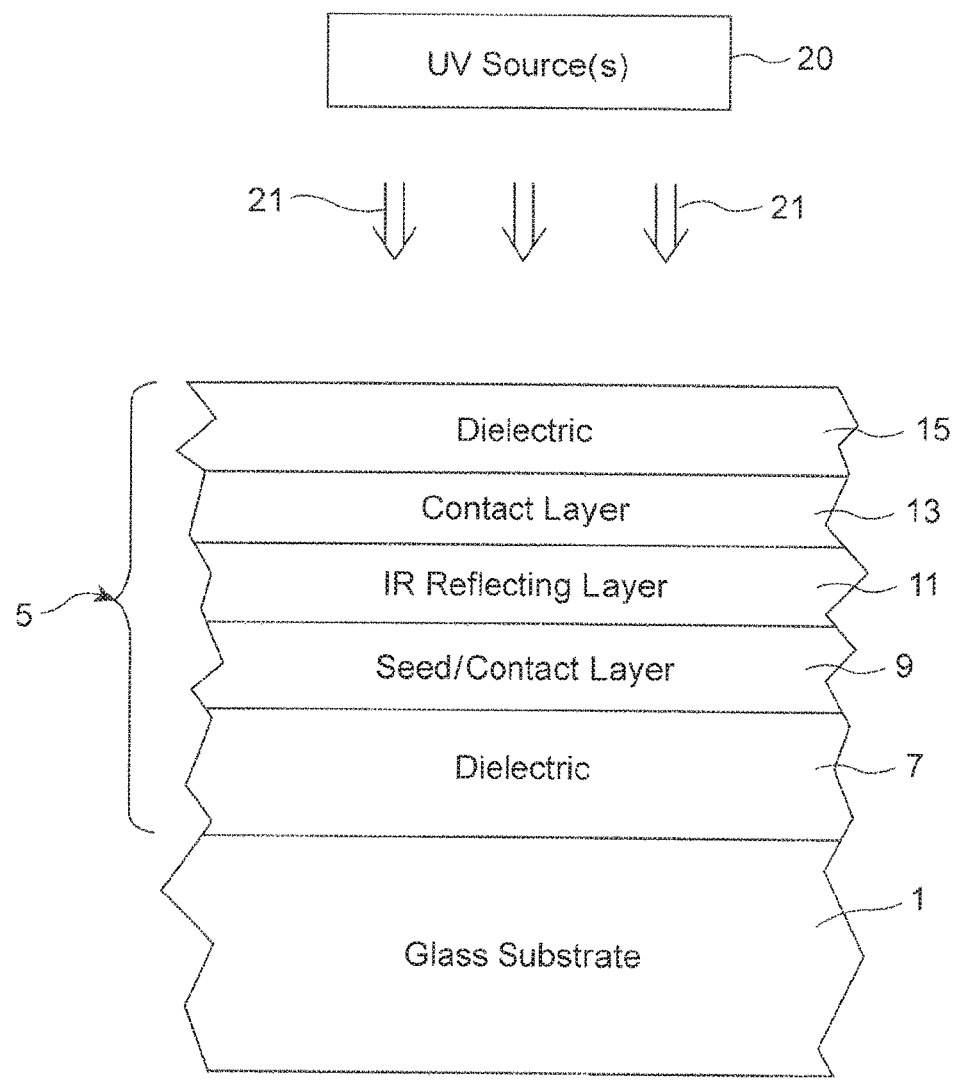
FIG. 1 is a cross sectional view of a technique used in making a coated article for use in a window according to an example embodiment of this invention.

Referring now more particularly to the accompanying drawings in which like reference numerals indicate like parts throughout the several views.

Figure 2:
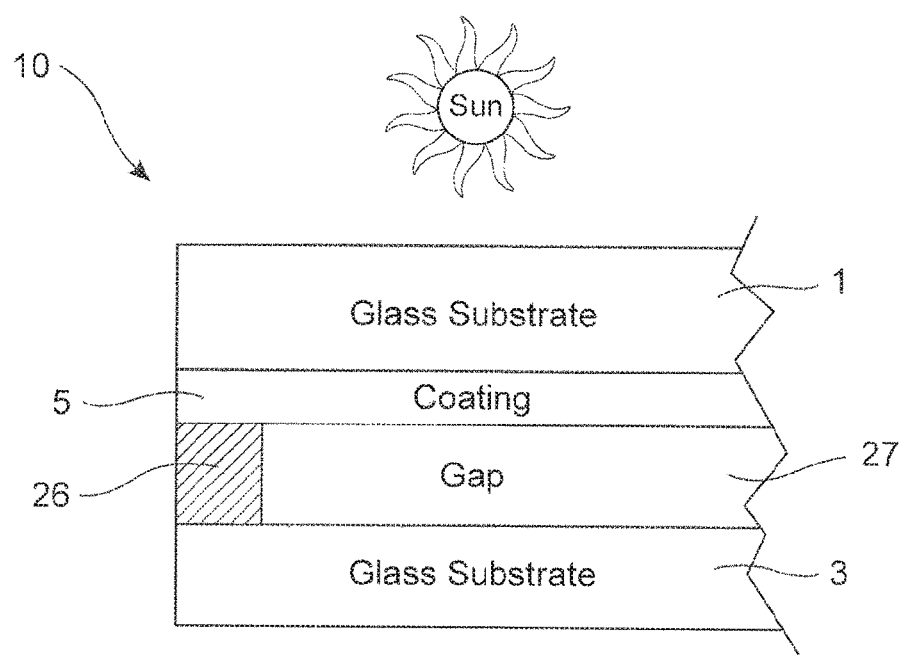
FIG. 2 is a partial cross sectional view of an insulating glass (IG) window unit made using at least the technique of FIG. 1.

Referring to FIGS. 1-2, certain example embodiments of this invention relate to a coated article including a low-emissivity (low-E) coating 5 on a substrate (e.g., glass substrate) 1 for use in a window, where the low-E coating 5 is intentionally exposed to intense ultraviolet (UV) radiation 21 in order to improve the coating's and thus the coated article's electrical, thermal blocking, and/or optical properties. A radiation source(s) 20 may be used to expose the coating to UV radiation emitted therefrom. The radiation source(s) 20 may be an ultraviolet (UV) laser and/or lamp for emitting UV radiation 21 in certain example embodiments, such as a UV excimer or UV solid state laser. The low-E coating 5 may include at least one metallic and/or substantially metallic infrared (IR) reflecting layer 11 comprising or consisting essentially of silver, where the silver inclusive layer 11 is located on (e.g., grown on by sputtering) and directly contacting a contact/seed layer 9 comprising or consisting essentially of a material such as zinc oxide, tin oxide, and/or zinc stannate. The IR reflecting layer 11 and contact/seed layer 9 may be located between dielectrics 7 and 15 in the low-E coating. Exposing the low-E coating 5 to UV radiation 21, e.g., emitted from a UV lamp(s) and/or UV laser(s) 20, allows for selective heating of the contact/seed layer(s) 9 (e.g., of zinc oxide, tin oxide, and/or zinc stannate) which in turn transfers the heat energy to the adjacent IR reflecting layer 11 of or including silver. This heating of the silver inclusive layer 11, by way of the heat generated by the contact/seed layer's absorbing of the UV and resulting heat generation, improves the silver layer's electrical, optical and/or thermal blocking properties. For example, this heating of the silver based layer 11 caused by exposing the low-E coating 5 to the UV radiation 21 increases the silver based layer's conductivity (lowers its resistance) which in turn increases its ability to block (e.g., reflect) undesirable IR radiation. As another example, this heating of the silver based layer 11 caused by low-E coating's exposure to the UV radiation 21 increases the visible transmission of the silver based layer 11 thereby improving its optical properties. In certain example embodiments, the entire or substantially the entire coating (with respect to its area as viewed from above) is exposed to the UV radiation, so that the entire or substantially the entire silver based layer 11 is improved with respect to electrical, optical and/or thermal blocking properties. The bandgap of the contact/seed layer(s) 9 is such that the contact/seed layer(s) 9 absorbs more UV radiation than any other layer (7, 11, 13, 15) in the coating in certain example embodiments, and thus is the main layer(s) that generates heat. Intense UV exposure causes the contact/seed layer 9 and silver based layer 11 to heat up in exposed areas. Heating of the contact/seed layer 9 causes the adjacent silver layer 11 to also heat up in the UV exposed areas thereby physically changing the silver layer 11 in those areas so as to densify and cause the silver layer 11 to become more conductive and more transparent to visible light in the exposed areas. Uses of UV radiation 21 from source(s) 20 allows selective heating of the contact/seed layer 9 (which may be a semiconductor), with subsequent transfer of the heat energy to the adjacent silver based layer 11 (as opposed to IR irradiation which would largely be wasted on the glass). Good choices for material of the seed/contact layer 9 are zinc oxide or zinc stannate semiconductors with bandgaps ranging from about 3.15 to 3.45, more preferably from about 3.2 to 3.4 eV, which causes the contact/seed layer 9 to absorb UV wavelengths shorter 364-387 nm. For example, the emission line at 355 nm, common for excimer and solid state UV lasers, is absorbed by such seed/contact layer materials but is poorly absorbed by glass 1 (only up to 15% of the 355 nm UV radiation is absorbed by glass) so that the glass is not significantly heated thereby. The UV treatment may be performed after the entire low-E coating 5 has been deposited on the substrate, and/or during or after the contact/seed layer 9 and the silver inclusive layer 11 have been deposited but before other overlying layers 13 and 15 are deposited. The energy used to improve the quality of the silver based layer 11 via UV exposure is a fraction of the energy required to cause essentially the same changes while heating the coated article during a thermal tempering process in a conventional convection furnace where the majority of energy is wasted on heating the glass. It will be recognized that the UV exposure does not thermally temper the glass substrate 1 that supports the coating 5. Thus, glass substrate 1 is not thermally tempered in certain example embodiments of this invention.

The UV treated coated article, with its improved electrical, optical and/or thermal blocking properties, may be used in the context of monolithic or insulating glass (IG) window units such as architectural windows for office buildings and/or apartment buildings, windows for homes, windows for freezer doors, and/or vehicle windows. In IG window unit embodiments (e.g., see FIG. 2), the IG window unit includes first and second substrates (e.g., glass substrates) 1 and 3 spaced apart from one another, wherein at least one of the substrates 1 supports UV treated solar coating 5 such as a low-emissivity (low-E) coating. In monolithic window embodiments, a substrate (e.g., glass substrate) 1 supports UV treated coating 5.

There are numerous advantages of improving silver quality via UV exposure, without having to heat the glass 1 supporting the coating 5 in a typical convection oven during thermal tempering. Heating of the glass substrate 1 (e.g., in a convection oven during thermal tempering) is associated with the leaching out of certain diffusible elements from the glass such as sodium and potassium. When migrating to the glass surface, these elements can compromise the quality of the glass and/or coating and contribute to corrosion in certain situations over long periods of time. Thus, it is desirable to be able to heat the silver 11 via UV 21 without having to significantly heat the glass substrate 1 that is supporting the coating 5. In this respect, the UV source(s) 20 may be positioned on the same side of the glass substrate 1 that the coating 5 is located, to further reduce heating of the glass as the seed/contact layer 9 absorbs significant amounts of UV radiation before it reaches the glass substrate 1. While it is possible that the glass 1 may be thermally tempered before and/or after UV exposure according to certain example embodiments of this invention, it is pointed out that thermal tempering is not necessary to improve the quality of the silver due to the UV exposure. Moreover, if the silver quality can be improved via UV without necessarily requiring thermal tempering, then both temperable and non-temperable low-E products can be made using essentially the same recipe or layer stack; in such a case the improvement of silver quality for non-temperable products can be done via UV exposure discussed herein while the improvement of silver quality for temperable products can be done with via convectional tempering and/or via a combination of non-thermal (e.g., chemical) tempering and UV exposure discussed herein. Moreover, with UV exposure, improvement in silver quality can be achieved using a fraction of the energy compared to convectional heating such as thermal tempering.

FIG. 1 is a cross sectional view of a technique used in making a window according to an example embodiment of this invention. As shown in FIG. 1, there is provided a coated article including a glass substrate 1 that supports a solar control coating 5. While substrate 1 is preferably of glass, it could be of other material. Example solar management/control coatings (e.g., low-E coatings) 5 which may be provided on substrate 1 are described in U.S. Pat. Nos. 8,173,263, 8,142,622, 8,124,237, 8,101,278, 8,017,243, 7,998,320, 7,964,284, 7,897,260, 7,879,448, 7,858,191, 7,267,879, 6,576,349, 7,217,461, 7,153,579, 5,800,933, 5,837,108, 5,557,462, 6,014,872, 5,514,476, 5,935,702, 4,965,121, 5,563,734, 6,030,671, 4,898,790, 5,902,505, 3,682,528, all of which are hereby incorporated herein by reference. In certain example embodiments, the solar management coating 5 may have an emissivity ($E_n$) of no greater than 0.12, more preferably no greater than 0.10, and/or a sheet resistance ($R_s$) of no greater than 10 ohms/square, more preferably no greater than 8 ohms/square. Of course, solar management coatings (e.g., low-E coatings) 5 herein are not limited to these particular coatings, and any other suitable solar management coatings capable of blocking amounts of IR radiation may instead be used. Solar management coatings 5 herein may be deposited on substrate 1 in any suitable manner, including but not limited to sputtering (e.g., at approximately room temperature), vapor deposition, and/or any other suitable technique.

A low-E coating typically includes at least one IR reflecting layer of or including silver 11 sandwiched between at least a lower dielectric 7 and an upper dielectric 15. The example low-E coating 5 in FIG. 1 may include, for example, a lower dielectric layer(s) 7 of or including titanium oxide or silicon nitride, a lower contact/seed layer 9 of or including zinc oxide (e.g., ZnO), zinc aluminum oxide, zinc stannate (e.g., ZnSnO), tin oxide, and/or combinations thereof, IR reflecting layer 11 of or including silver or gold, upper contact layer 13 of or including Ni and/or Cr (e.g., NiCr, $NiCrO_x$, $NiO_x$, or the like) that is located over and directly contacting the silver based layer 11, and upper dielectric layer(s) 15 of or including silicon nitride and/or tin oxide. The metal oxide based contact/seed layer 9 may optionally be doped with material such as Al, Ni or Ti. In certain example embodiments, dielectric layer 15 may be made up of a lower layer of or including tin oxide and an upper layer of or including silicon nitride and/or silicon oxynitride. Optionally, an overcoat of or including zirconium oxide may be provided over dielectric layer 15. The layers of the thin film coating 5 may be deposited in any suitable manner, such as at approximately room temperature via sputtering. While the low-E coating 5 illustrated in FIG. 1 has only one IR reflecting layer 11 of or including silver, it will be appreciated that other low-E coatings that may be used for coating 5 may include multiple silver based IR reflecting layers as illustrated and/or described in some of the patents identified above. When the coating has two silver based layers formed on corresponding seed layers, when the UV source(s) 20 is located on the coating side of the glass as shown in FIG. 1 then the uppermost silver layer realizes more quality improvement than the lower silver layer because the seed/contact layer under the upper silver layer absorbs significant amounts of UV before it is able to reach the seed/contact layer under the lower silver layer; however, depending upon the intensity and duration of UV treatment both of the silver layers can realize quality improvement because some UV will reach the lower silver layer and the lower seed/contact layer.

One or more radiation source(s) 20 is/are provided in order to expose substantially the entire area of the coating 5 (as viewed from above) to UV radiation. For example, in the FIG. 1 embodiment, the source 20 may be one or more UV lamp(s) that emit mainly UV radiation toward the coated article and/or one or more UV lasers that emit mainly UV radiation toward the coated article. The UV may include or be radiation in the ranges of from about 300-400 nm, or from about 300-380 nm, in certain example embodiments. In certain example embodiments, the source(s) 20 is located on the coating 5 side of the glass substrate 1 so as to reduce the amount that the glass substrate 1 itself is heated up during the exposure (e.g., the glass is not intentionally heated by the source 20). The UV radiation 21 emitted from the source(s) 20 causes the contact/seed layer(s) 9 and/or silver based layer(s) 11 in the coating 5 to heat up. For instance, the seed layer 9 absorbing the UV radiation and the resulting heating of the contact/seed layer 9 causes at least the adjacent silver (or gold) inclusive IR reflecting layer 11 to also heat up in the exposed areas thereby physically changing at least the silver layer 11 so as to become more dense and cause the silver layer 11 to become more conductive and more transparent to visible light. The UV exposure causes the coating 5 to one or both of (i) have its sheet resistance ($R_s$) drop by at least 1 ohm/sq., and/or (ii) have its visible transmission increase by at least 1%. For example, if the coating's sheet resistance is 9 ohms/square prior to the UV exposure, after the UV exposure the coating will have a sheet resistance of no greater than 8 ohms/square.

The contact/seed layer 9 (e.g., of or including zinc oxide and/or zinc stannate) may have a bandgap of from about 3.0 to 3.45 eV, more preferably from about 3.15 to 3.45 eV, even more preferably from about 3.2 to 3.4 eV, and most preferably about 3.2 eV, and because of this bandgap the contact/seed layer 9 absorbs UV radiation 21 from the source 20 (e.g., about 355 nm and/or about 308 nm) and heats up. The seed layer 9 may be a semiconductor or dielectric. At least the silver in layer 11 in the UV exposed area next to the heated layer 9 is in turn heated and physically changes in the heated area(s) by densifying and becoming more conductive (less resistance), more transparent to visible light and/or differently colored. Thus, the characteristics of the layer stack are introduced as the UV is absorbed by the seed/contact layer 9 with a subsequent release of thermal energy to at least the adjacent silver (or gold) based layer 11 and possible to other layer(s) in the stack. Accordingly, the physical and optical properties of the IR reflecting silver layer 11 are changed by the UV exposure. The exposed area will then have a higher visible transmission and improved IR blocking.

FIG. 1 illustrates exposing the coating 5 to the UV radiation after the entire coating 5 has been deposited (e.g., sputter deposited) on substrate 1; however, it may be possible to instead perform the UV exposure in order to expose at least layers 9 and 11 immediately after layer 11 has been deposited (and/or during deposition of layer 11) but before layer 13 and/or 15 has been deposited. And the UV exposure may or may not be performed in a vacuum chamber in different example embodiments of this invention. The monolithic coated article of FIG. 1, after being exposed as illustrated in FIG. 1 and as described above, may then be used as a monolithic window or alternatively may be used in an IG window unit along with at least one more glass substrate as shown in FIG. 2.

FIG. 2 is a cross sectional view of a portion of an IG window unit according to an example embodiment of this invention, where the IG window unit includes the UV treated coated article made in accordance with FIG. 1. As shown in FIG. 2, the IG window unit includes first substrate 1 and second substrate 3 (e.g., both can be glass substrates) that are spaced apart from one another at least by one or more peripheral seal(s) or spacer(s) 26. Optionally, an array of spacers (not shown) may be provided between the substrates in a viewing area of the window for spacing the substrates from one another as in the context of a vacuum IG window unit. The spacer(s) 26, other spacer(s), and/or peripheral seal space the two substrates 1 and 3 apart from one another so that the substrates do not contact one another and so that a space/gap 27 is defined therebetween. The space/gap 27 between the substrates 1, 3 may be evacuated to a pressure lower than atmospheric in certain example embodiments, and/or may be filled with a gas (e.g., Ar) in certain example embodiments. Alternatively, space 27 between the substrates 1, 3 need not be filled with a gas and/or need not be evacuated to a low pressure. In certain example embodiments, it is possible to suspend foil or other radiation reflective sheet(s) (not shown) in the space. When substrate(s) 1 and/or 3 are of glass, each glass substrate may be of the soda-lime-silica type of glass, or any other suitable type of glass, and may be for example from about 1 to 10 mm thick in certain example embodiments of this invention. The UV treated coating 5, formed as discussed above in accordance with FIG. 1, may be formed continuously across substantially the entirety of the supporting substrate and may be located on an interior side of substrate 1 to face the gap/space 27 as shown in FIG. 2, or alternatively may be located on the interior side of substrate 3 to face the gap/space 27. Coating 5 (e.g., low-E coating) blocks (i.e., reflects and/or absorbs) certain amounts of IR radiation and prevent the same from reaching the building interior. It will be appreciated by those skilled in the art that IR blocking/reflecting layer(s) 11 of coating 5 need not block all IR radiation, but only needs to block significant amounts thereof.

In view of the presence of IR blocking/reflecting coating (i.e., solar management coating) 5, IG window units according to certain example embodiments of this invention as shown in FIG. 2 may have the following solar characteristics (e.g., where the coated glass substrate 1 is a substantially transparent soda lime silica glass substrate from about 1-6 mm thick, more preferably from about 2 to 3.2 mm thick, and the other soda lime silica glass substrate 3 is substantially transparent and from about 1-6 mm thick, more preferably from about 2 to 3.2 mm thick). In Table 1 below, $R_gY$ is visible reflection from the outside or exterior of the window/building (i.e., from where the sun is located, and $R_fY$ is visible reflection from the interior side (e.g., from within the building interior).

TABLE 1

| IG Unit Solar Characteristics | | | |
|---|---|---|---|
| Characteristic | General | Preferred | More Preferred |
| $T_{vis}$ (or TY)(Ill. C., 2 deg.): | >=50% | >=60% | >=68% |
| $R_gY$ (Ill. C., 2 deg.): | 5 to 17% | 7 to 13% | 9 to 11% |
| $R_fY$ (Ill. C., 2 deg.): | 5 to 20% | 7 to 14% | 10 to 12% |
| U-value: | 0.10 to 0.40 | 0.20 to 0.30 | 0.22 to 0.25 |

It is noted that certain parameters can be tuned by adjusting layer thicknesses. For example, sheet resistance can be decreased and visible transmission decreased by increasing the thickness of the silver based layer 11 and/or by providing the coating with additional silver based layer(s). In certain example embodiments, the coating 5 in the FIG. 1-2 embodiments may have a sheet resistance ($R_s$) of no greater than 10 ohms/square, more preferably no greater than 8 ohms/square, and most preferably no greater than 6 ohms/square.

In certain example embodiments of this invention, there is provided a method of making a coated article for use in a window, the method comprising: having a coated article including a substrate that supports a coating comprising at least one layer comprising silver located directly on and contacting a layer comprising metal oxide that can absorb ultraviolet (UV) radiation; directing UV radiation from at least one UV source toward the coating and exposing the coating to UV radiation in order to reduce a sheet resistance of the coating and/or increase visible transmission of the coating.

In the method of the immediately preceding paragraph, the UV source may comprise at least one UV emitting lamp.

In the method of any of the preceding two paragraphs, the UV source may comprise at least one UV emitting laser.

In the method of any of the preceding three paragraphs, said exposing the coating to UV radiation may reduce the sheet resistance of the coating by at least one ohm/square, more preferably by at least about 1.5 or 2 ohms/square.

In the method of any of the preceding four paragraphs, the layer comprising metal oxide may have a bandgap of from about 3.2 to 3.4 eV.

In the method of any of the preceding five paragraphs, the layer comprising metal oxide may comprise zinc oxide.

In the method of any of the preceding six paragraphs, the layer comprising metal oxide may comprise zinc stannate.

In the method of any of the preceding seven paragraphs, the coating may be a low-E coating.

In the method of any of the preceding eight paragraphs, the coating may have a sheet resistance ($R_s$) of no greater than 10 ohms/square after said UV exposing.

In the method of any of the preceding nine paragraphs, said exposing the coating to UV radiation may increase the visible transmission of the coated article by at least 1%, more preferably by at least about 1.5 or 2%.

In the method of any of the preceding ten paragraphs, the coated article may have a visible transmission of at least about 50% after said exposing.

In the method of any of the preceding eleven paragraphs, the substrate may be a glass substrate.

In the method of any of the preceding twelve paragraphs, the method may further comprise, after said exposing, coupling the substrate with the coating thereon to another substrate in making an insulating glass (IG) window unit.

In the method of any of the preceding thirteen paragraphs, radiation emitted from the source may consist essentially of UV radiation.

In the method of any of the preceding fourteen paragraphs, the coating may further comprise a layer comprise (a) an oxide of Ni and/or Cr located over and directly contacting the layer comprising silver, and/or (b) a dielectric layer comprising silicon nitride located over the layer comprising silver.

In the method of any of the preceding fifteen paragraphs, the source and the coating can be located on the same side of the substrate.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers there between.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of making a coated article for use in a window, the method comprising:
    having a coated article including a glass substrate that supports a coating comprising at least one layer comprising silver located directly on and contacting a layer comprising zinc oxide that can absorb ultraviolet (UV) radiation, the coating further comprising a dielectric layer between the layer comprising zinc oxide and the glass substrate, and at least one upper dielectric layer located over the layer comprising silver so that the layer comprising silver is located between at least the upper dielectric layer and the glass substrate;
    directing UV radiation from at least one UV source toward the coating and exposing the coating to UV radiation in order to reduce a sheet resistance of the coating; and
    wherein the coated article has a visible transmission of at least about 50% after said exposing.

2. The method of claim 1, wherein the UV source comprises at least one UV emitting lamp.

3. The method of claim 1, wherein the UV source comprises at least one UV emitting laser.

4. The method of claim 1, wherein said exposing the coating to UV radiation reduces the sheet resistance of the coating by at least 1 ohm/square.

5. The method of claim 1, wherein the layer comprising zinc oxide has a bandgap of from about 3.2 to 3.4 eV.

6. The method of claim 1, wherein the coating has a sheet resistance ($R_s$) of no greater than 10 ohms/square after said UV exposing.

7. The method of claim 1, wherein said exposing the coating to UV radiation increases the visible transmission of the coated article by at least 1%.

8. The method of claim 1, further comprising, after said exposing, coupling the substrate with the coating thereon to another substrate in making an insulating glass (IG) window unit.

9. The method of claim 1, wherein radiation emitted from the source consists essentially of UV radiation.

10. The method of claim 1, where the coating further comprises a layer comprising an oxide of Ni and/or Cr located over and directly contacting the layer comprising silver.

11. The method of claim 1, wherein the upper dielectric layer comprises silicon nitride.

12. The method of claim 1, wherein the source and the coating are located on the same side of the substrate.

13. The method of claim 1, wherein the layer comprising zinc oxide comprises zinc stannate.

14. A method of making a coated article, the method comprising:
having a coated article including a glass substrate that supports a low-E coating comprising at least one substantially metallic layer comprising silver located directly on and contacting a contact layer comprising metal oxide that has a bandgap of from 3.2 to 3.4 eV, the low-E coating further comprising a dielectric layer between at least the contact layer and the glass substrate, and an upper dielectric layer located over at least the substantially metallic layer comprising silver so that the substantially metallic layer comprising silver is located between at least the upper dielectric layer and the glass substrate;
exposing the coating to UV radiation from at least one UV source in order to reduce a sheet resistance of the coating and increase visible transmission of the coating; and
wherein the coated article has a visible transmission of at least about 50% after said exposing.

15. The method of claim 14, wherein the layer comprising metal oxide comprises zinc oxide.

16. The method of claim 14, wherein the layer comprising metal oxide comprises zinc stannate.

17. The method of claim 14, wherein the UV source comprises at least one UV emitting lamp and/or laser.

18. The method of claim 14, wherein said exposing the coating to UV radiation reduces the sheet resistance of the coating by at least 1 ohm/square.

19. The method of claim 18, wherein the coating has a sheet resistance ($R_s$) of no greater than 10 ohms/square after said UV exposing.

20. The method of claim 19, wherein said exposing the coating to UV radiation increases the visible transmission of the coated article by at least 1%.

21. The method of claim 14, wherein radiation emitted from the source consists essentially of UV radiation.

22. The method of claim 14, where the coating further comprises a layer comprising an oxide of Ni and/or Cr located over and directly contacting the layer comprising silver.

23. The method of claim 14, wherein the upper dielectric layer comprises silicon nitride.

* * * * *